United States Patent [19]

Banner

[11] Patent Number: 5,197,685
[45] Date of Patent: Mar. 30, 1993

[54] STATOR WINDING METHOD AND APPARATUS INCLUDING WINDING FORMS MOUNTED ON COIL SUPPORT EXTENSIONS

[75] Inventor: Alvin C. Banner, Kettering, Ohio

[73] Assignee: Globe Products Inc., Huber Heights, Ohio

[21] Appl. No.: 648,172

[22] Filed: Jan. 30, 1991

[51] Int. Cl.⁵ .......................................... B65H 81/06
[52] U.S. Cl. ............................................. 242/1.1 R
[58] Field of Search .............. 242/1.1 R, 1.1 A, 1.1 E; 29/605, 596; 403/344

[56] References Cited

U.S. PATENT DOCUMENTS

| Re. 25,281 | 6/1962 | Moore | 242/1.1 R |
|---|---|---|---|
| 1,741,969 | 12/1929 | Bellows | 403/344 |
| 2,810,848 | 10/1957 | Roberts | 242/1.1 E |
| 2,923,484 | 2/1960 | Roberts | 242/1.1 E |
| 3,281,084 | 10/1966 | Lill | 242/1.1 R |
| 3,331,562 | 7/1967 | Beushausen | 242/1.1 E |
| 3,648,938 | 3/1972 | Dryburgh | 242/1.1 E |
| 4,679,312 | 7/1987 | Nussbaumer et al. | 242/1.1 R |
| 4,732,338 | 3/1988 | Eminger et al. | 242/1.1 R |
| 4,762,283 | 8/1988 | Sabatino | 242/1.1 R |
| 4,982,908 | 1/1991 | Luciani | 242/1.1 R |

FOREIGN PATENT DOCUMENTS 779417 7/1957 United Kingdom ............ 242/1.1 A

OTHER PUBLICATIONS

Disclosure Prepared For Submission in this Application Admitted to be Prior Art-6 pages Date Prior to Jan. 30, 1991 (see Paper No. 7, pp. 2 and 3).

Primary Examiner—Daniel P. Stodola
Assistant Examiner—Tony A. Gayoso
Attorney, Agent, or Firm—Roger S. Dybvig

[57] ABSTRACT

For winding a field coil onto a two pole stator core of the type having pole pieces with coil support extensions with outwardly extending coil retaining fingers, two pairs of winding forms are removably supported on carriages manipulated to mount the winding forms on the coil support extensions before winding a stator and to remove the winding forms after winding. During winding, the winding forms are clamped to the coil support extensions by spring-biased latch mechanisms interconnecting the opposite pairs of winding forms. Each latch mechanism includes a rotatable latch member which, in one embodiment, is rotatable about an axis that is generally parallel to the longitudinal axis of the stator being wound or, in another embodiment, is rotatable about an axis generally perpendicular to the longitudinal axis of the stator being wound.

15 Claims, 3 Drawing Sheets

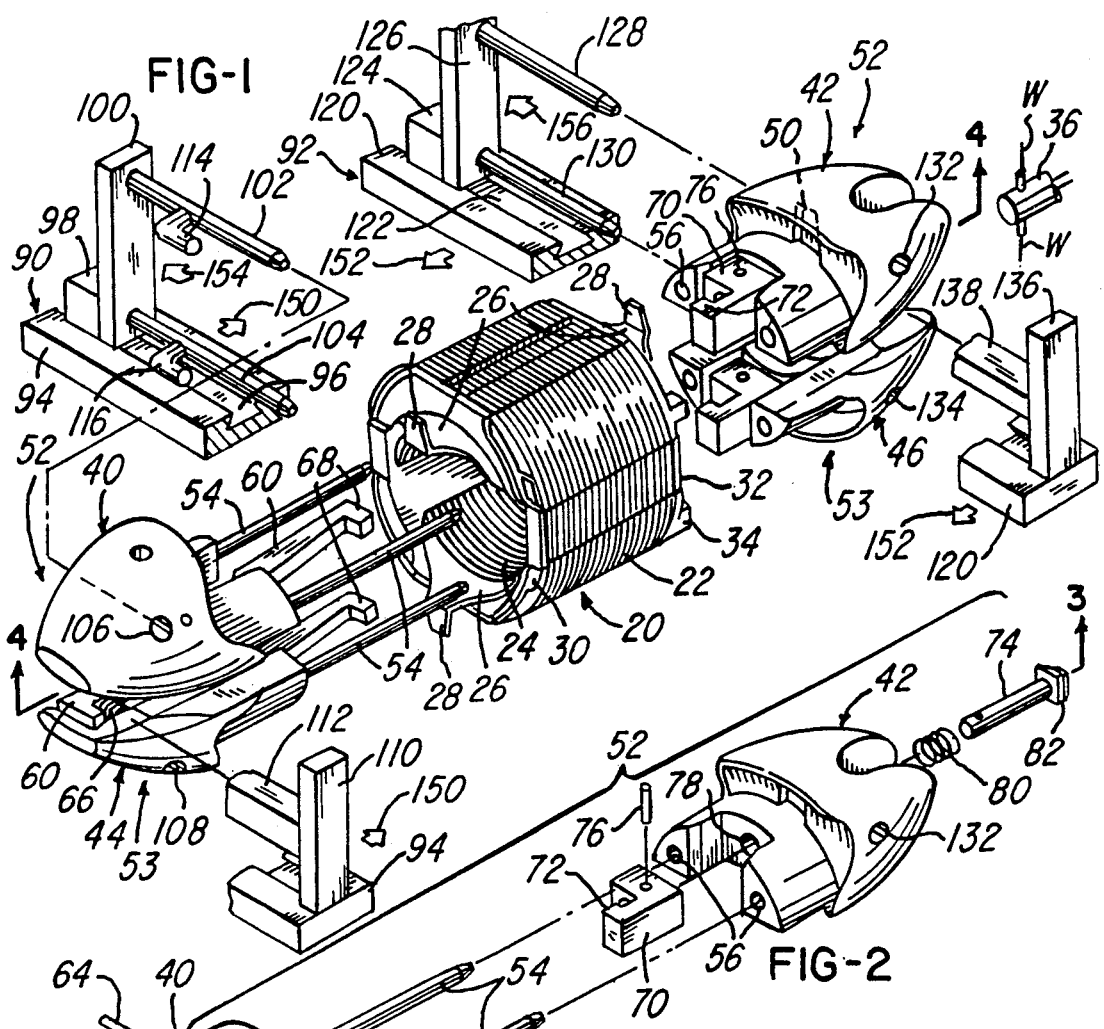
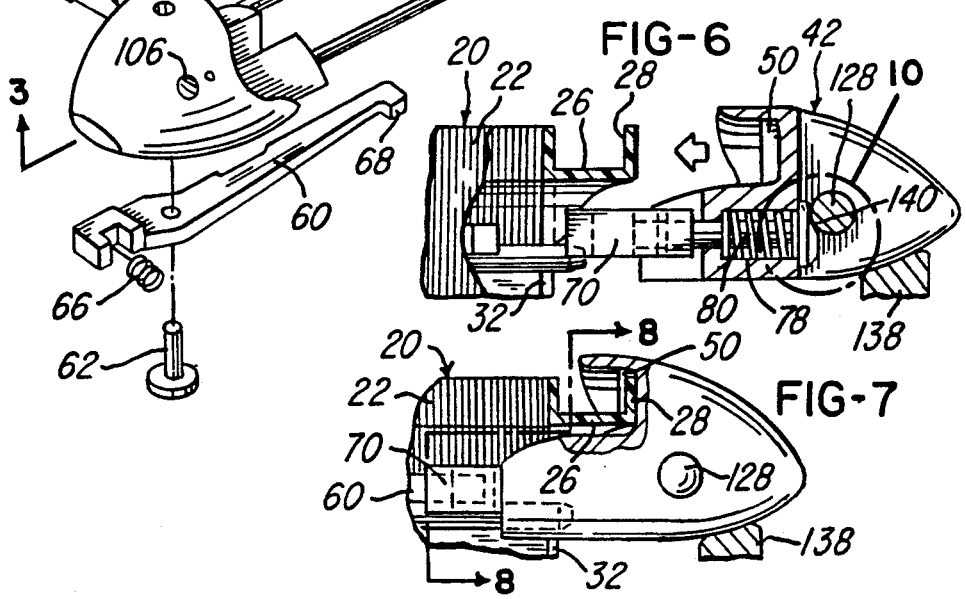

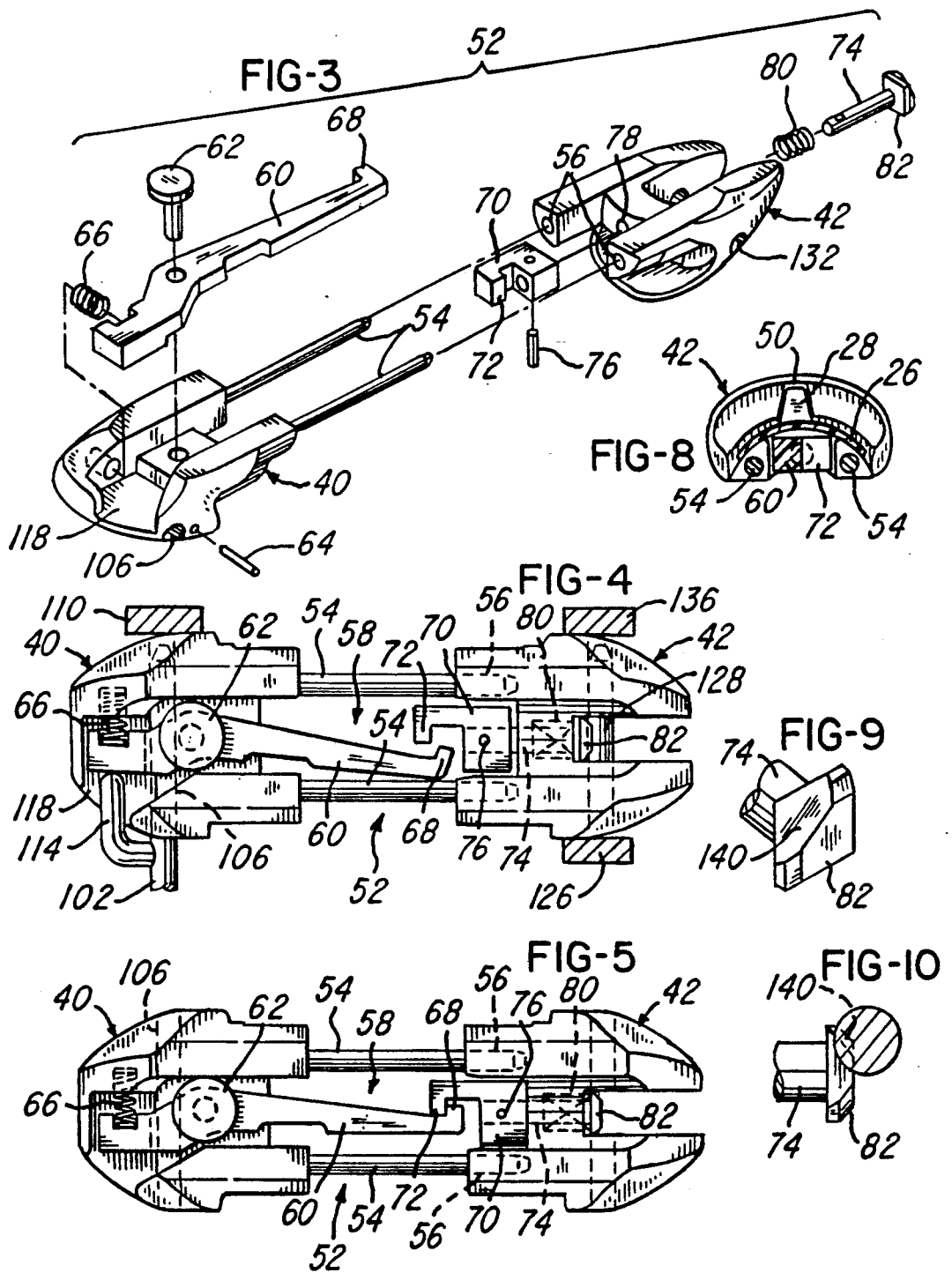

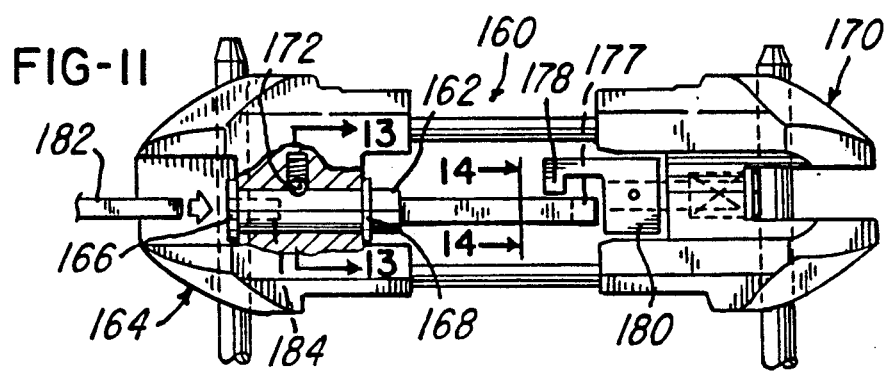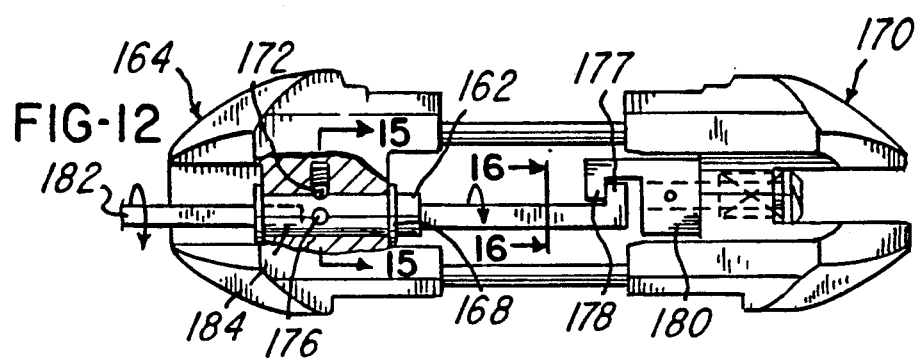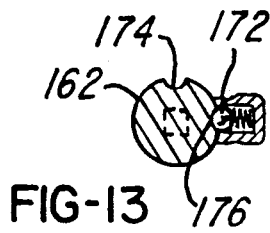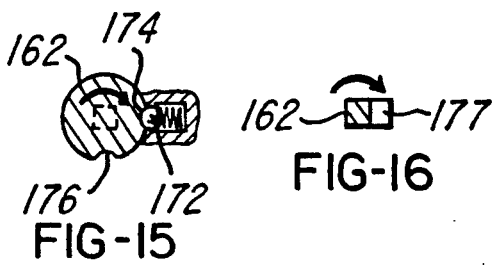

STATOR WINDING METHOD AND APPARATUS INCLUDING WINDING FORMS MOUNTED ON COIL SUPPORT EXTENSIONS

SUMMARY OF THE INVENTION

This invention relates to a stator winding method and apparatus and especially to a method and apparatus for winding two pole stators for dynamoelectric devices.

This invention is primarily intended for winding stators of the type having coil support extensions connected to the pole pieces and extending from both end faces of the stator for the purpose of supporting the stator coil end turns, the coil support extensions having outwardly directed coil-retaining fingers spaced from the end faces of the stator core.

This invention is intended for use with well known methods and apparatus for winding stators wherein coils of wire drawn from sources of wire under tension are wound around the pole pieces by a reciprocating and oscillating winding head or ram. The winding head or ram is driven by a mechanism such as that shown in U.S. Pat. No. 4,158,314. A common practice when winding two pole stators in this fashion is to use two pairs of oppositely directed shrouds or winding forms, one pair for each pole, that guide the wire segments exiting from the winding head around the pole pieces. The shrouds or winding forms are usually secured to the stator by pairs of form-retaining clamps or blades but it has been recognized that there are disadvantages to the use of the form retaining blades. The manipulations required to operate the blades or clamps are time-consuming and significantly limit production speeds. In addition, space for insertion of the blades must necessarily be provided by a gap between the end faces of the stator core and the coil end turns, a factor which can have a negative effect upon the characteristics of the wound coils.

A primary object of this invention is to provide a method and apparatus for winding a two pole stator utilizing shrouds or winding forms which may be rapidly and securely assembled onto a stator core and rapidly disassembled from the stator core. A related object of this invention is to provide a method and apparatus that do not require the use of form-retaining blades. A further object of this invention is to provide a method and apparatus wherein the steps of assembly and disassembly of the winding forms on the stator cores are accomplished automatically.

In accordance with this invention, two pairs of winding forms are mounted on the coil support extensions and have surfaces engaging the outermost surfaces of the coil retaining fingers thereon so that the winding forms are prevented from moving radially inwardly of the stator core. Each pair of winding forms has a latch mechanism interconnecting them, and a spring, coacting between one of the winding forms and the latch mechanism, biases the winding forms against the coil support extensions.

A pair of winding form carriages move the winding forms toward and away from a stator to be wound and support the winding forms when not supported by a stator.

Each latch mechanism comprises a latch lever rotatably connected to one of the winding forms and extending toward the opposed winding form on the opposite end of the stator. The latch lever terminates in a free end adjacent the opposed winding form and has a latching flange extending generally perpendicularly from the free end. A latch retaining member is mounted on the opposed winding form. The latch retaining member has a latch hook positioned to be engaged with and disengaged from the latching flange by rotation of the latch lever.

Two embodiments of latch levers are disclosed herein. In one embodiment, which is presently preferred, the latch lever is rotatable or pivoted about an axis generally perpendicular to the longitudinal axis of a stator to which the winding forms are connected. In the second embodiment, the latch lever is rotatable about an axis generally parallel to the longitudinal axis of a stator to which the winding forms are connected. In either case, the latch retaining member is slidably mounted on the opposed winding form.

Winding form carriages are provided for automatically assembling the winding forms onto a stator and disassembling the winding forms from the stator. The carriages are provided with means for supporting the winding forms and for manipulating the latch mechanisms.

Other objects and advantages will become apparent from the following description and the drawings.

BRIEF DESCRIPTION OF THE DRAWINGS

FIG. 1 is a perspective view of a stator to be wound, a fragment of a winding head used to wind coils on the stator, and upper and lower pairs of winding forms manufactured in accordance with this invention in position to be connected to the stator. In addition, FIG. 1 includes a fragmentary perspective view of portions of carriages in accordance with this invention for positioning the winding forms and controlling the latch mechanisms that connect the winding forms to one another when they are assembled on a stator. To better reveal details of construction, the parts of the carriages are shown spaced from the winding forms. FIG. 1 also diagrammatically illustrates the movements of these mechanisms.

FIG. 2 is an exploded perspective view of the upper pair of winding forms of FIG. 1.

FIG. 3 is an exploded perspective view of the upper pair of winding forms as viewed generally from below, as indicated by the sight line 3—3 of FIG. 2.

FIG. 4 is a bottom plan view of the upper pair of winding forms, as viewed in the direction of arrows 4—4 of FIG. 1, but FIG. 4 represents the position of the parts at a later stage in the assembly thereof. FIG. 4 additionally includes a fragmentary plan view of a portion of the form positioning and connecting mechanisms.

FIG. 5 is a bottom plan view of the upper pair of winding forms similar to FIG. 4, but represents the winding forms after they have been fully assembled on the stator. The stator is not shown in FIGS. 4 and 5 in order to avoid a confusion of lines.

FIG. 6 is a fragmentary side elevational view, with parts broken away and parts shown in cross-section, showing one of the winding forms as it is being assembled onto a stator.

FIG. 7 is a fragmentary side elevational view, with parts broken away and parts shown in cross-section, similar to FIG. 6, but showing the winding form after it is assembled on a stator.

FIG. 8 is an end elevational view of the winding form of FIG. 7 taken along line 8—8 of FIG. 7 and showing, in cross section, a portion of the coil support extensions on the stator and a portion of the other winding forms.

FIG. 9 is a fragmentary perspective view of the head of a mounting pin forming part of the mechanism for interconnecting the two upper winding forms together.

FIG. 10 is a enlarged fragmentary side elevational view of a portion of the mechanism of FIG. 6 within circle 10 thereof, including the mounting pin illustrated in FIG. 9.

FIG. 11 is a bottom plan view similar to FIG. 4 but of another embodiment of winding forms in accordance with this invention.

FIG. 12 is a bottom plan view similar to FIG. 5 but of the embodiment of FIG. 11.

FIG. 13 is a cross-sectional view, taken along line 13—13 of FIG. 11, of a portion of a winding form latch and a ball detent device used therewith.

FIG. 14 is a cross-sectional view of another portion of the winding form latch, taken along section line 14—14 of FIG. 11, and illustrating the position of a hook at the end of the latch when the latch is in the position illustrated in FIG. 11 before the winding forms are latched together.

FIG. 15 is a cross-sectional view similar to FIG. 13 but taken along line 15—15 of FIG. 12 and illustrating the parts after the forms are latched together.

FIG. 16 is a cross-sectional view similar to FIG. 14 but taken along line 16—16 of FIG. 12 to show the position of the hook after the winding forms are assembled together.

DETAILED DESCRIPTION

With reference to FIG. 1, this invention relates to a stator winding method and apparatus for winding a two pole stator, generally designated 20, for a dynamoelectric device. Stator 20 includes a substantially hollow, generally cylindrical laminated core 22 formed with a pair of longitudinally-extending, diametrically opposed, pole pieces 24. As is now a common practice, both ends of both pole pieces 24 are provided with longitudinally-extending coil support extensions 26 for supporting the end turns of the stator coils. Coil retaining fingers 28 project generally radially outwardly from the free ends of the coil support extensions 26, i.e. The ends most remote from the end faces of the stator core 22. Stator 20 additionally comprises a plastic end plate 30 covering the left end face of the core 22 (as viewed in FIG. 1) and the opposite end face is covered by another plastic end plate or terminal board 32 having sockets 34 for terminal posts (not shown), the construction of which is unimportant for purposes of this invention. The coil support extensions are typically integrally formed with the plastic end plates.

Coils of wire (not shown) are wound on the pole pieces 24 by means of a winding head or ram 36, shown in greatly simplified form in FIG. 1, that draws two wires W from sources of wire under tension (not shown) and reciprocates through the bore of the stator and oscillates at each end of each reciprocating stroke, as well known, to wind two coils simultaneously, one around each pole piece 24. The ram 36 may be driven by the mechanism shown in United States patent No. 4,158,314, or by any one of several other mechanisms that have been developed for this purpose.

As is also well known, at the beginning of the winding operations, the free ends of the wires W are gripped by wire clamps (not shown) near the stator 20 and, after the coils are wound, the wire segments leading from the wound coils may be temporarily clamped by other clamps (not shown) in fixed relation to the stator and thereafter connected to terminal posts positioned in the sockets 34. The manner in which the wires are handled may be entirely conventional and forms no part of this invention, and is therefore not illustrated or further described herein There are four wire-guiding shrouds or winding forms shown in FIG. 1, namely a pair of upper winding forms 40 and 42 and a pair of lower winding forms 44 and 46. Here it may be noted that terms such as upper and lower, left and right, and the like, are used in a relative sense and not in an absolute sense herein. For example, the stator 20 is shown in FIG. 1 as if its longitudinal axis is essentially horizontal but it could be vertical or at some other angle relative to horizontal.

In accordance with this invention, the shrouds or winding forms 40, 42, 44 and 46 are secured to the stator core 20 without the use of the usual form-retaining clamps or blades. For this purpose, the winding forms 40, 42, 44, and 46 are mounted on the coil support extensions 26 and have centrally located recesses or pockets 50 facing the stator core 22 that, when the winding forms are assembled on the stator core 22, receive the coil retaining fingers 28. As will be described below, the winding forms are spring-biased against the coil support extensions 26 so that the engagement of the coil retaining fingers 28 within the recesses or pockets 50 prevents the winding forms from accidentally moving radially inwardly of the stator core 22. Pocket 50 is shown in FIGS. 1, 6, 7 and 8.

With reference to FIGS. 2 through 5, the upper pair of winding forms 40 and 42, when assembled on the stator 20, are interfit and latched together to form an upper winding form assembly, generally designated 52. The lower pair of winding forms 44 and 46, shown only in FIG. 1, also form a lower winding form assembly, generally designated 53, which is an exact mirror image of the upper winding form assembly 52, as will readily be understood by those familiar with the art. Accordingly, only the upper winding form assembly 52 is further illustrated and described herein In the remainder of this text, parts of the lower winding form assembly 53 that functionally correspond to parts of the upper winding form assembly 52 described hereafter are identified by the same reference numerals.

The left side upper winding form 40 is a male member having a pair of elongate rods 54 adapted to extend through the stator bore and the upper right side winding form 42 is a female member having a pair of sockets 56 for slidably receiving the free ends of the rods 54. In addition to being interfit by the rods 54 and the sockets 56, the assembled upper winding forms 40 and 42, as shown in FIG. 5, are latched together by a latch mechanism, generally designated 58, comprising a latch member or lever 60 rotatably or pivotally mounted on the male winding form 40 by a pivot pin 62 affixed to the body of the winding form 40 by a small set screw 64. As will be observed, the axis of rotation of the latch lever 60 is generally perpendicular to the longitudinal axis of the stator 20, and the latch lever 60 is biased to rotate about the axis of the pivot pin 62 by means of a coil spring 66 coacting between one end of the latch lever 60 and an internal surface of the male winding form 40. The other, free end of the latch lever 60 forms a hook 68 for purposes which will become apparent.

A latch retaining member 70, having a latching flange 72 is affixed to a latch retaining mounting pin 74 by a roll pin 76. Latch retaining mounting pin 74 is slidably mounted for movement in a direction parallel to the longitudinal axis of the stator 20 in a bore 78 extending through the body of the female winding form 42. As best shown in FIG. 6, the outer end of the bore 78 is enlarged to receive a form-biasing spring 80 coiled about the latch retaining mounting pin 74 and coacting between the enlarged head, designated 82, of the latch retaining mounting pin 74 and the confronting surface of the female winding form 42. Enlarged head 82 has straight sides confined between confronting surfaces of the female form 42 so that the latch retaining member 70 is prevented from rotating.

When the winding forms 40 and 42 are fully assembled as shown in FIG. 5, the form-biasing spring 80 is effective to bias the latching flange 72 against the latch hook 68 at the end of the latch lever 60. In addition, the form-biasing spring 80 urges both the male and the female winding forms 40 and 42 toward the stator core 22 to securely hold them against the coil support extensions 26 so that the coil retaining fingers 28, lodged within the pockets 50 will be effective to prevent the winding forms 40 and 42 from moving radially inwardly of the stator 20.

FIG. 1 illustrates a pair of winding form carriages, namely a male winding form carriage 90 and a female winding form carriage 92. Carriages 90 and 92 are used to assemble and disassemble the winding forms 40, 42, 44 and 46 and the stator 20. In practice, an unwound stator 20 would be held by a track (not shown) or other apparatus, such as a turret (not shown), in position to receive the winding forms 40, 42, 44 and 46 at a form-loading station represented in FIG. 1. The form-loading station would also be the winding station if the winding took place at that station—as is suggested by the illustration of the ram 36 in FIG. 1. However, assembly of the forms and the stator could take place either at the winding station or at another station, such as a stator load/unload station.

Male form support carriage 90 includes a slide track 94 with a dovetail groove 96 that receives a slide 98 which carries a vertical support bracket 100 from which project a pair of horizontal form support pins 102 and 104 adapted to enter, respectively, through bores 106 and 108 in the left side, or male, upper and lower winding forms 40 and 44. A vertical stop plate 110 is mounted on the near end (as viewed in FIG. 1) of the slide track 94 and carries a spacer 112 that, when the slide track 94 is appropriately positioned relative to the male winding forms 40 and 44, enters the gap between them. Spacer 112 cooperates with the form support pins 102 and 104 to maintain the relative positions of the male winding forms 40 and 44 so that their rods 54 remain horizontally oriented when they are not interengaged with the female forms 42 and 46.

Male form support carriage 90 further comprises an upper latch release pin 114 and a lower latch release pin 116 that are adapted to enter notches 118 in the sides of the male winding forms 40 and 44 and engage the ends of their latch levers 60 biased by the springs 66. When so engaged, the upper and lower latch levers 60 are rotated or pivoted against the bias of their associated springs 66 out of engagement with their associated latch retaining member 70. (See FIG. 4) In FIG. 4 it will also be observed that the stop plate 110 abuts the side of the winding form 40 opposite the notch 114 in order to prevent the winding form 40 sliding off its support pin 102 under influence of the spring 66.

Female form carriage 92 includes a slide track 120 with a dovetail groove 122 that receives a slide 124 which carries a vertical support bracket 126 from which project a pair of horizontal female form support pins 128 and 130 adapted to enter, respectively, through bores 132 and 134 in the right side, or female, upper and lower winding forms 42 and 46. A vertical stop plate 136 is mounted on the near end (as viewed in FIG. 1) of the slide track 120 and carries a spacer 138 that, when the slide track 120 is appropriately positioned relative to the female winding forms 42 and 46, enters the gap between them. Spacer 138 cooperates with the form support pins 128 and 130 to maintain the relative positions of the female winding forms 42 and 46 so that their sockets 56 remain horizontally oriented when they are not interengaged with the rods 54 of the male forms 40 and 44.

With reference to FIGS. 4, 6, 9 and 10, the head 82 of the latch retaining pin 74 is formed with a sloping or cam surface 140 that is engaged by the female form support pin 128 as it passes therethrough, whereupon the latch retaining member 70 is pushed against the bias of the spring 80 toward the male winding form 40. As will be further described below, the latching flange 72 of the latch retaining member 70 is thereby disengaged from the latch lever hook 68.

To better show details, the male winding forms 40 and 44 are shown in FIG. 1 separated from the female forms 42 and 46 and the form supporting parts of the winding form carriages 90 and 92 are shown separated from the winding forms. This condition would not occur in practice. Rather, the winding forms are always supported on the carriages 90 and 92 except when they are locked on the core support extensions of a stator. In operation, with an unwound stator 20 at the form loading station, the forms carried by the carriages 90 and 92 are advanced toward one another, as indicated by the arrows 150 and 152, until the parts reach the position shown in FIG. 4. The stator is not illustrated in FIG. 4 but FIG. 4 represents the position of the parts of the upper winding form assembly 52 when the forms 40 and 42 are fully advanced toward one another and engaged with the stator coil support extensions. During the advancement of the forms 40 and 4 toward one another, the axial alignment of the male rods 54 with the female sockets 56 is assured because the spring 66 urges the male form 40 toward its associated stop plate 110 so that the desired location of the male form 40 is maintained and the female winding form 42 is clamped between its associated stop plate 136 and support bracket 126. Of course, the relative axial positions of the stop plates 110 and 136 are controlled in any suitable manner, such as by mechanical guides (not shown).

When the winding forms are held against the stop plates 110 and 136, the latch lever 60 carried by the male form 40 is held "open" out of a latching position, as shown in FIG. 4, by reason of the engagement of the latch release pin 114 therewith. Immediately after the parts reach the position shown in FIG. 4, the carriage slide 98 is retracted from the male winding form 40, in the direction of the arrow 154 in FIG. 1, whereupon the latch release pin 114 is disengaged from the latch lever 60, permitting it to respond to the bias of the spring 66 by rotating so that its hook 68 engages behind the latching flange 72. Retraction of the male form support carriage slide 98 is continued until the male form support pin 102 is retracted out of the bore 106.

After the latch lever 60 rotates into a latch "closed" position, the female form support carriage 92 is retracted, as indicated by arrow 156 in FIG. 1. Accordingly, the female form support pin 128 is moved out of engagement with the head 82 of the latch retaining pin 74 and the latch retaining member 70, under the bias of its associated spring 80, is pulled outwardly (to the right as viewed in FIG. 4) so that its latching flange 72 becomes firmly engaged with the latch lever hook 68. Both carriages 90 and 92 are moved away from the stator, in respective directions opposite to the arrows 150 and 152 in FIG. 1. The upper winding form assembly 52 is now free from the carriages 90 and 92 and latched together as shown in FIG. 5. Spring 80 effectively pulls on the male winding form 40 and pushes on the female winding form 42 so that the two forms are thereby biased into engagement with the coil support extensions of the stator in the form loading station. The stator coils are now wound whereafter the latch mechanism 58 is u latched and the winding forms 40 and 42 are removed from the stator by manipulation of the carriages 90 and 92. The manner in which the carriages 90 and 92 unlatch and remove the winding forms is apparent from the foregoing description. However, it should be noted that the female form support pin 128 is desirably inserted into the bore 132 of the female form 42 sufficiently to move the latching flange 72 out of engagement with the latch lever hook 68 before the male latch release pin 114 presses against the latch lever 60. Otherwise, the interengaged hook 68 and flange 72 might frictionally interfere with the operation of the male form support carriage 90.

It will be apparent that the lower winding forms 42 and 46 will be manipulated in the same way as, and simultaneously with, the upper winding forms 42 and 44.

FIGS. 11 and 12 show a modified winding forms assembly, generally designated 160, having a latch member or lever 162 rotatably mounted in a bore in a male winding form 164 for rotation about an axis generally parallel to the axis of a stator (not shown) on which the winding form assembly 160 is mounted. The latch lever is held against axial movement relative to the winding form 164 by its head 166 and a retaining ring 168. The cooperating female winding form, designated 170, may be identical to the female winding form 42 described above.

In operation, the latch lever 162, which is frictionally restrained by a spring biased ball element 172 cooperating with detents 174 and 176 on the lever 162, is rotated in opposite directions through 90° to either enable its hook, designated 177, to be engaged with or disengaged from a latching flange 178 of a spring biased latch retaining member 180. Compare the unlatched condition shown in FIGS. 11, 13 and 14 with the latched condition shown in FIGS. 12, 15 and 16. Rotation of the latch lever 162 is readily accomplished by use of suitable tool 182 adopted to be engaged within a depression 184 in the outer end of the latch lever 162. The tool 182 and its operating mechanisms are preferably mounted on the same carriage (not shown) that manipulates the male winding form 164 or they may be separately mounted.

Although the presently preferred embodiments of this invention has been described, it will be understood that within the purview of this invention various changes may be made within the scope of the following claims.

I claim:

1. In a stator winding apparatus for winding a field coil onto a two pole stator core of the type having pole pieces with coil support extensions that support the end turns of the stator coils, said coil support extensions having outwardly extending coil retaining fingers, said apparatus being of the type comprising a winding head assembly that reciprocates and oscillates to draw wire from a source of wire under tension to wind said coils and having two pairs of interfitting winding forms located on opposite sides of the stator core for guiding the wire over said coil support extensions and around said pole pieces, the improvement wherein said winding forms are constructed to be mounted on said coil support extensions and have surfaces engaging the outermost surfaces of said coil retaining fingers so that said winding forms are prevented from moving radially inwardly of said stator core, each pair of said winding forms having a latch mechanism interconnecting them, and each pair of said winding forms having spring means coacting between one of said winding forms and said latch mechanism for biasing said winding forms against said coil support extensions.

2. The improvement of claim 1 further comprising a pair of winding form carriages that move said winding forms toward and away from a stator to be wound, both of said winding form carriages including means for supporting said winding forms when not supported by a stator core.

3. The improvement of claim 1 wherein said latch mechanism comprises a latch lever rotatably connected to one of said winding forms and extending toward the other of said winding forms of the same pair of winding forms and terminating in a free end adjacent the other of said winding forms, said latch lever having a latching flange extending generally perpendicularly from said free end thereof, and said latch mechanism further comprises a latch retaining member mounted on said other of said winding forms, said latch retaining member having a latch hook positioned to be engaged with and disengaged from said latching flange by rotation of said latch lever.

4. The improvement of claim 3 wherein said latch lever is rotatable about an axis generally parallel to the longitudinal axis of a stator core on which said winding forms are mounted.

5. The improvement of claim 4 wherein said latch retaining member is slidably mounted on said other of said winding forms and said spring means comprises a spring coacting between said latch retaining member and said other of said winding forms.

6. The improvement of claim 4 wherein said first winding form includes detent means for resisting rotation of said latch lever into or out of engagement with said latching flange.

7. The improvement of claim 6 further comprising means for rotating said latch lever.

8. The improvement of claim 3 wherein said latch lever is rotatable about an axis generally perpendicular to the longitudinal axis of a stator core on which said winding forms are mounted.

9. The improvement of claim 8 wherein said latch retaining member is slidably mounted on said other of said winding forms and said spring means comprises a spring coacting between said latch retaining member and said other of said winding forms.

10. The improvement of claim 9 further comprising a winding form carriage that moves said one of said winding forms toward and away from a stator to be wound.

11. The improvement of claim 10 wherein said one of said winding forms has an aperture extending therethrough, and said winding form carriage includes a pin slidable in said aperture for supporting said one of said winding forms when not supported by a stator core.

12. The improvement of claim 10 wherein said latch mechanism further comprises second spring means engaged with said one of said winding forms for biasing said latch lever into engagement with said latch retaining member, and said carriage includes means engagable with said latch lever for rotating the same against the bias of said second spring means when said one of said winding forms is supported by said carriage.

13. In a method for winding a field coil onto a two pole stator core of the type having pole pieces with coil support extensions extending therefrom, said coil support extensions having outwardly extending coil retaining fingers, using apparatus of the type comprising a winding head assembly that reciprocates and oscillates to draw wire from a source of wire under tension to wind said coils, the steps of mounting said winding forms on said coil support extensions with surfaces of said winding forms so engaged with the outermost surfaces of said coil retaining fingers so that said winding forms are prevented because of the engagement between said winding forms and said outermost surfaces of said coil retaining fingers from moving radially inwardly of said stator core, clamping said winding forms to said coil support extensions, winding coils on said stator, and removing said winding forms.

14. The method of claim 13 further comprising the steps of providing a pair of carriages, supporting said two pairs of winding forms on said carriages, and accomplishing said mounting and removing steps by manipulation of said carriages.

15. The method of claim 13 wherein said winding forms are clamped to said coil support extensions by coupling the two winding forms of each pair of winding forms to one another by means including resilient means that biases said two winding forms of each pair toward one another.

* * * * *